Dec. 10, 1929.  G. R. OBER  1,738,791
LEVEL
Filed March 18, 1926
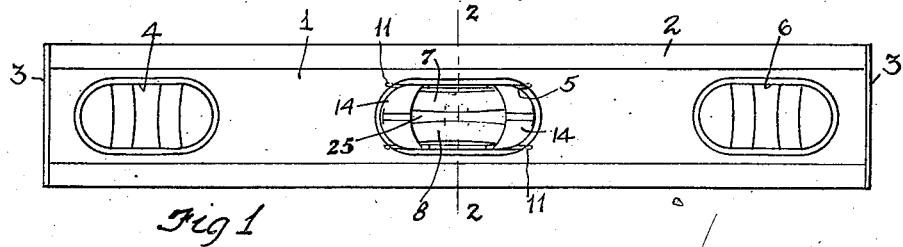
Fig. 1
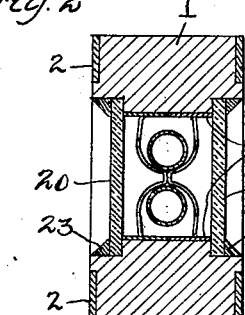 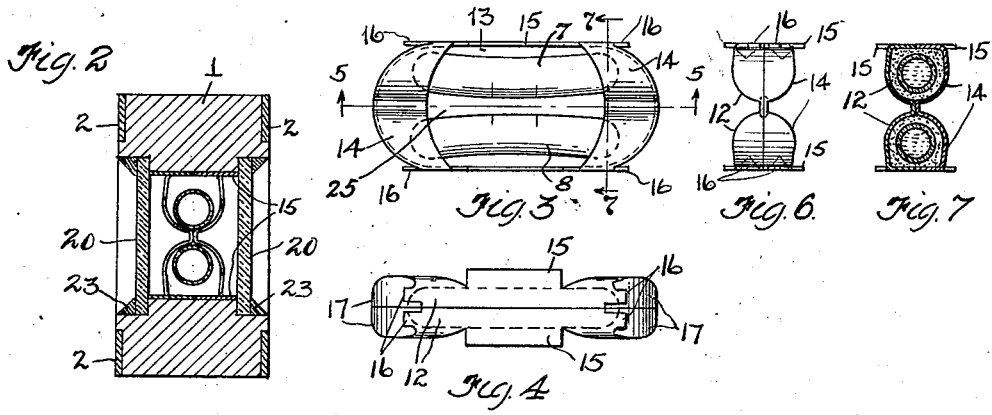
Fig. 2  Fig. 3  Fig. 6.  Fig. 7
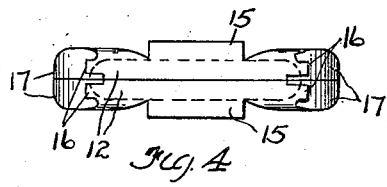
Fig. 4
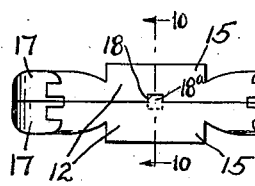 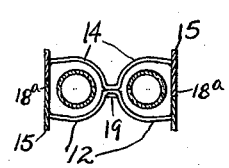
Fig. 8  Fig. 9.  Fig. 10
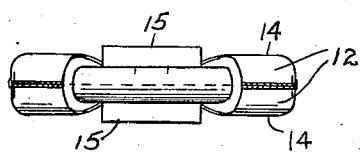 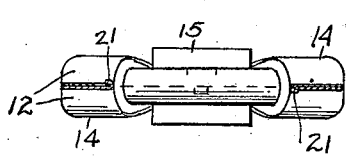
Fig. 5.  Fig. 11
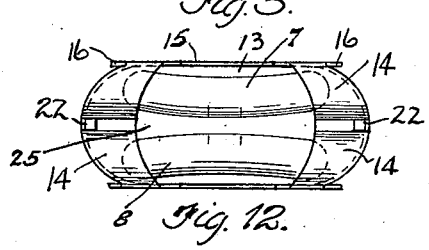
Fig. 12.
INVENTOR.
Gale R. Ober
BY
Fay, Oberlin & Fay
ATTORNEYS.

Patented Dec. 10, 1929

1,738,791

UNITED STATES PATENT OFFICE

GALE R. OBER, OF CHAGRIN FALLS, OHIO, ASSIGNOR TO THE OBER MFG. COMPANY, OF CHAGRIN FALLS, OHIO, A CORPORATION OF OHIO

LEVEL

Application filed March 18, 1926. Serial No. 95,576.

This invention as indicated relates to an improvement in levels more particularly it comprises a level such as is used by carpenters, masons and the like, having one or more transverse openings through the same within which are affixed one or more vials having an air bubble to indicate when a level position has been reached, such vials being enclosed in a frame of special construction which permits the ready installation of the vial or vials and which also permits of replacement of vials in levels which have heretofore been in use and require new vials because of breakage or for other reasons.

It has heretofore been proposed to provide metal sockets to receive the ends of vials and also to provide chambers in the wood body of the level to receive the vials. Such constructions do not admit of quantity production with a high standard of accuracy.

The principal object of the present invention is to simplify the construction of levels and to provide a more efficient piece of apparatus of improved appearance, and having indicating parts easily assembled or replaced in the event of injury. Other and further objects will appear in the course of the following description.

To the accomplishment of the foregoing and related ends, said invention, then consists of the means hereinafter fully described and particularly pointed out in the claims.

The annexed drawing and the following description set forth in detail certain structures embodying the invention, such disclosed means constituting, however, several of various structural forms in which the principle of the invention may be used.

In said annexed drawing:

Fig. 1 is a side elevation of a level embodying the features of my invention. Fig. 2 is an enlarged sectional view taken along the line 2—2 shown in Fig. 1. Fig. 3 is a side elevation of the vial holding plates. Fig. 4 is a plan view of the vial holding plates shown in Fig. 3. Fig. 5 is a view partly in section taken along the line 5—5 shown in Fig. 3. Fig. 6 is an end view of the construction shown in Figs. 3 and 4, the pair of plates being held by means of solder. Fig. 7 is a sectional view taken along the line 7—7 shown in Fig. 3. Fig. 8 is a view similar to Fig. 4 showing a modified form of construction. Fig. 9 is a view similar to Fig. 5, showing the modified form of construction illustrated in Fig. 8. Fig. 10 is a transverse sectional view taken along the line 10—10 shown in Fig. 8. Fig. 11 is a view similar to Figs. 5 and 9 showing a still further modified form of construction, and Fig. 12 is a side elevation similar to Fig. 3 showing a construction wherein the one plate is provided with a pair of tongues and the other plate with a pair of notches.

As is clearly shown in the drawing the body of the level 1 preferably formed of wood or equivalent material, reinforced at the side edges and ends by metal strips 2, 3 preferably of brass, is provided with one or more transverse apertures 4, 5, 6, within each of which is mounted a pair of vials 7, 8, carrying a liquid and providing an air bubble for indicating purposes. The vials in the central opening 5 are preferably carried in a longitudinal position and the vials in the openings 4, 6, adjacent the ends of the body are preferably positioned transversely of the body. The openings are preferably elongated openings having parallel sides and rounded ends. The ends of said openings at the points where the parallel sides merge therewith may be provided with notches 11 in alignment with such sides of a length suitable to receive extensions upon the companion stamped metal plates presently to be described. The notches are preferably formed from each side of the opening and do not pass entirely through the body thus leaving a wood fin or partition between the extensions on said companion stamped metal plates. In practice it is found that by pressing the plates into the body of the level from opposite sides, the extensions will cut their own notches and the plates will be very firmly held in position.

As will be clearly seen from Figs. 2, and 4 to 11, of the drawing, the companion plates 12 are formed of sheet metal, identical in form and having a large central opening 13 and a pair of end members 14 of crescent shape. Each end member is formed with a central longitudinal depression providing on the opposite side a pair of substantially semi-cylindrical half-socket members adjacent each end. The sides 14 of said plates are disposed at right angles to the crescent shaped end portions thereof and have central wings or extensions 15 to give greater frictional engagement with the body along the parallel sides of the opening. At each of the corners of the plates, extension ears 16 are provided in alignment with the side portions of the device, said ears being adapted to engage into the notches 11, heretofore described, and securely hold the plates in position.

At the respective ends of each of the plates, flanges 17 bent at right angles to the crescent shaped portions are provided so as to form end closures for the vial receiving sockets when a pair of companion plates are fitted against each other in the manner shown in Figs. 2 and 4 to 11.

In addition to forming the plates to provide the end closures it may be found desirable to provide upon each plate on one side portion, a notch 18, and on the opposite side portion, a projecting tongue, 18ª, while one of the arc-shaped portions is provided centrally with a projecting tongue 19. The manner in which the tongues and notches coact to hold the parts together is clearly shown in Figs. 8, 9, 10, 11 and 12; thus, the laterally extending tongues 18 engaging the notches 17 of their companion plates prevent end motion of the parts, the tongues 19 at the ends of the plates when engaged about the adjacent portion of the companion plate locking the parts together. Thus, after placing the parts together by merely bending the end tongues, a pair of companion plates may be locked together so as to provide a rigid housing for the vials of the level. The tongues 19 may be formed centrally of one end of each plate and extend outwardly, as is shown in Figs. 9 and 10, or a similar tongue 21 may be formed on one inner edge of the plate centrally on the longitudinal axis, as is shown in Fig. 11, or both tongues 22 may be formed on one plate, as is shown in Fig. 12 in which event the lateral tongues and notches may be dispensed with, the end tongues serving to prevent both lateral and endwise movement.

The vials 25 are preferably seated in their housings in a plastic composition support such as plaster of Paris provided with a retarding ingredient to prevent too rapid setting of the same.

When the levels are newly constructed, the companion plates are preferably pressed into the openings from opposite sides thereof until such plates contact with each other and form sockets to receive the vials. The sockets are then filled with suitable plastic material and the vials are inserted therein and positioned so as to give accurate indications preliminary to the setting of such material. The frictional engagement of the companion plates is sufficient in degree to firmly hold the same within the openings without other securing means, although solder may be applied to the meeting inner central portions or locking tongues at such points may be provided.

Wherever it is desired to replace vials which have been broken, it is found advantageous to supply the vials and frames in assembled relation ready to insert in the openings of the level from one side thereof, the wood fins, if any, being cut or broken away. In such instance, the companion plates may be soldered together preliminary to the insertion of the plastic material and the vials. When locking tongues are used to hold the parts assembled the plates are engaged and interlocked by means of the tongues and recesses, and the vials may then be inserted in the plastic material provided in the respective sockets.

The openings within which the plates and vials are assembled may be left open but it has been found desirable to insert a glass closure 20 at each side of said opening, as is shown in Fig. 2 of the drawing. Such closures are formed similar in shape to the outline of the openings and are held in position by any suitable securing means, a ring of putty 23 being shown in Fig. 2 for such purpose.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. An article of the character described having in combination a level stock provided with a transverse aperture, a pair of stamped metal plates adapted to coact with each other to form a vial receiving frame, said plates having arcuate end portions and enlarged side portions positioned at right angles thereto, said arcuate end portions being each provided with a pair of depressed semi-circular seats with closed ends to coact with the ends of a leveling vial when said frames are housed.

2. An article of the character described having in combination a level stock provided with a transverse aperture, a pair of stamped metal plates adapted to coact with each other to form a vial receiving frame, said plates having arcuate end portions and enlarged side portions positioned at right angles thereto, said arcuate end portions being each provided with a pair of depressed semi-circular seats with closed ends to coact with the ends of a leveling vial when said frames are housed, and an extension tongue on each plate adapted to interlock with its companion plate.

3. An article of the character described having in combination a level stock provided with a transverse aperture, a pair of stamped metal plates adapted to coact with each other to form a vial receiving frame, said plates having arcuate end portions and enlarged side portions positioned at right angles thereto, said arcuate end portions being each provided with a pair of depressed semi-circular seats with closed ends to coact with the ends of a leveling vial when said frames are housed, and a tongue and notch on each plate adapted to engage with a corresponding notch and tongue on its companion plate.

Signed by me this 11th day of March, 1926.

GALE R. OBER.